T. W. MOLL.
PIPE COUPLING.
APPLICATION FILED SEPT. 26, 1908.
924,262.
Patented June 8, 1909.
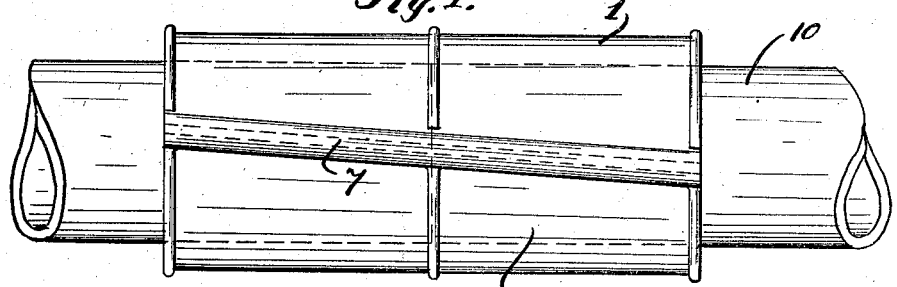
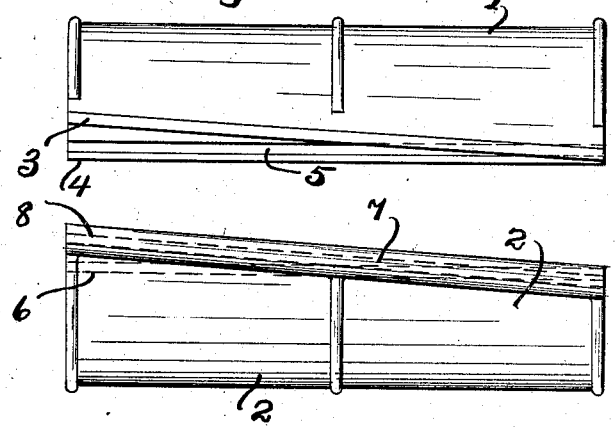
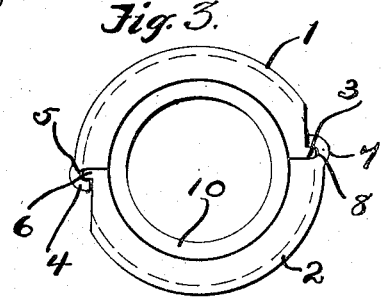
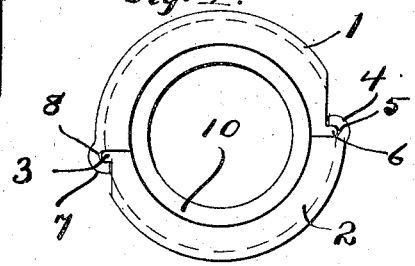
Witnesses:
H. J. Gittins.
H. L. McDonnell.
Inventor:
Theodore W. Moll
by Lynch & Dorer
Attorneys.

UNITED STATES PATENT OFFICE.

THEODORE W. MOLL, OF CLEVELAND, OHIO.

PIPE-COUPLING.

No. 924,262.  Specification of Letters Patent.  Patented June 8, 1909.

Application filed September 26, 1908. Serial No. 454,856.

*To all whom it may concern:*

Be it known that I, THEODORE W. MOLL, a citizen of the United States of America, residing at Cleveland, in the county of Cuyahoga and State of Ohio, have invented certain new and useful Improvements in Pipe-Couplers; and I hereby declare the following to be a full, clear, and exact description of the invention, such as will enable others skilled in the art to which it pertains to make and use the same.

This invention relates to pipe couplers or sleeves adapted to couple together the ends of pipe sections or to repair leaking or weak part of pipe.

The primary object of my invention is the provision of a coupler or pipe clamping sleeve consisting of two component parts, substantially semi-cylindrical in shape, which when shifted longitudinally of each other to clamping position will grip the pipe more firmly, and when once in position are less liable to become loose, than the couplers or sleeves heretofore employed.

A further object is the provision of a coupler or clamping sleeve having the above characteristics and which can be easily and cheaply manufactured.

With these ends in view my invention consists of a coupler or sleeve having certain novel features of construction which are described in the following detailed description, set forth in the appended claims and shown in the accompanying drawings.

In the drawings Figure 1 is an elevation of my improved coupler or pipe clamping sleeve attached to a pipe. Fig. 2 is an elevation of the two parts of the sleeve shown apart or separated. Fig. 3 is an end view of the sleeve looking at the left end of Fig. 1. Fig. 4 is an end view of the sleeve looking at the right end of Fig. 1.

Referring now to the figures of the drawing, 10 represents a pipe or the adjacent ends of two pipe sections about which is clamped the coupler or sleeve constructed in accordance with my invention. This clamping sleeve consists in two parts 1 and 2 which are substantially semicylindrical in shape and are adapted to be placed in clamping position about a pipe or the adjacent ends of two pipes or sections by shifting the same longitudinally of each other.

The portion 1 of the sleeve is provided along one edge or face with an outwardly extending flange 3 extending the length of the same, the face of the flange being continuous with or flush with the edge of the sleeve portion 1, and on the opposite side is provided with an outwardly rounded portion or flange 4 which curves inwardly forming a slot 5 which likewise extends the length of the sleeve portion 1. In a similar manner the portion 2 of the sleeve is provided along one face with an outwardly extending flange 6 and along the opposite face with an outwardly rounded portion or flange 7 which curves inwardly forming a slot 8. When the two parts of the sleeve are in clamping position the flange of each part engages the slot of the other part so as to be locked together.

The adjacent or abutting faces of the two parts of the sleeve on one side are not parallel with the faces on the opposite side, but on one side, for a purpose to appear, the faces are inclined with respect to the faces on the opposite side. By referring to the several figures of the drawing it will be seen that on one side of the sleeve, the adjacent flat faces and the corresponding flange and groove on the two parts respectively are inclined with respect to the axis of the sleeve or pipe and on the opposite side the adjacent flat faces and the corresponding flange and groove on the two parts respectively are parallel with the axis of the sleeve or pipe. This construction forms one of the main features of my invention, for, as will be explained, it causes the sleeve to grip the pipe more firmly than with the usual constructions and to lessen the liability of accidental displacement or relative movement of the two parts.

By referring particularly to Figs. 1 and 2 it will be seen that the edge or face of the portion 1 and the outwardly extending flange 3 are tapered or inclined while on the opposite side of the same portion the groove 5 is parallel to the axis. Also as appears from these figures the groove 8 of the portion 2 which receives the flange 3 of the portion 1 is similarly tapered or inclined, and on the opposite side the flange 6 which is received in the groove 5 is parallel to the axis. As appears from Figs. 1 and 2 the adjacent tapered faces or edges and the corresponding flange and groove extend both above and below the axis of the sleeve or pipe; at the right hand end, as shown in Fig. 1, being below the axis and at the left hand end being above the axis.

When it is desired to clamp the parts of the sleeve about a pipe or the ends of two pipe sections, one part of the sleeve is placed on one side of the pipe, and the other part of the sleeve on the opposite side of the pipe, with the flange and groove on one part registering with the groove and flange respectively on the other part. The parts or halves of the sleeve can then be moved longitudinally of the pipe and toward each other, with the flange of each part sliding within the groove of the other part. The peculiar arrangement of the flanges and grooves causes the parts to interlock very securely thereby forming a permanent union between the pipe and the said sleeve or coupler sections.

I do not desire to be confined to the exact details shown but aim in my claims to cover all modifications which do not involve a departure from the spirit and scope of my invention.

What I claim is,—

1. A pipe coupler or clamping sleeve, consisting of two parts having longitudinally extending abutting faces, said parts having on opposite sides interlocking flanges and grooves, the adjacent faces on one side being inclined to the axis of the sleeve and on the opposite side being parallel to the axis of the sleeve.

2. A pipe coupler or clamping sleeve consisting of two parts substantially semi-cylindrical in shape, said parts having on opposite sides interlocking flanges and grooves, the corresponding flange and groove on one side being inclined with respect to the axis of the sleeve, and the flange and groove on the opposite side being parallel with the axis of the sleeve.

3. A pipe coupler or clamping sleeve consisting of two parts having longitudinally extending abutting faces, each part having along one face an outwardly extending flange, and along the opposite face a groove, the flange of each part engaging the groove of the other part, whereby said parts are locked together, the corresponding flange and groove on one side of the sleeve being inclined with respect to the axis of the sleeve and the corresponding flange and groove on the opposite side of the sleeve being parallel to the axis of the sleeve.

In testimony whereof, I sign the foregoing specification, in the presence of two witnesses.

THEODORE W. MOLL.

Witnesses:
VICTOR C. LYNCH,
N. L. McDONNELL.